United States Patent Office 3,421,091
Patented Jan. 7, 1969

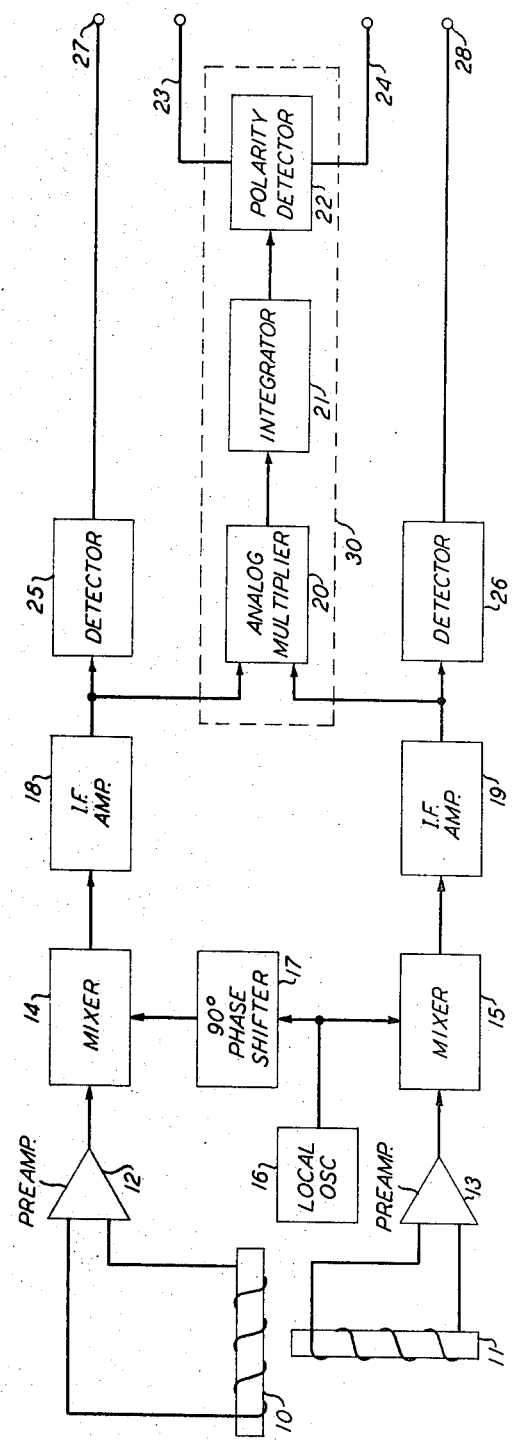

3,421,091
DETECTING CIRCUIT FOR CIRCULARLY POLARIZED WAVES
Walter L. Brown, Berkeley Heights, and Gabriel L. Miller, Westfield, N.J., assignors to Bell Telephone Laboratories, Incorporated, New York, N.Y., a corporation of New York
Filed Apr. 26, 1965, Ser. No. 450,988
U.S. Cl. 325—363        10 Claims
Int. Cl. H04b 1/10

ABSTRACT OF THE DISCLOSURE

A receiving system for detecting electromagnetic wave energy propagated in the circularly polarized mode is disclosed. The system utilizes two orthogonal antennas, the output of one of which is shifted ninety degrees. The two signals are then multiplied together with the result that only orthogonally polarized input components produce product with nonzero D.C. averages. The sense of polarization determines the polarity of the D.C. level produced. Thus the system discriminates strongly against wave energy transmitted in modes other than the circularly polarized mode.

---

This invention relates to electromagnetic wave receiving systems and, more particularly, to arrangements for detecting electromagnetic wave energy propagated in the circularly polarized mode.

It is often desirable to ascertain the mode of propagation of electromagnetic energy in a transmission system. For example, it may be necessary to ascertain the efficiency of a system designed to operate with electromagnetic waves of circular polarization. In these circumstances, it may be desirable to register the level of wave energy confined to circular polarization.

In addition to the above situation, certain scientific investigations of naturally occurring phenomena depend upon detecting wave propagation in the circularly polarized mode. In particular, it has been suggested that electromagnetic waves propagated through the magnetosphere in the slot region between the Van Allen belts may be useful in explaining the structure of these outer space regions. Such electromagnetic waves are propagated in the so-called "whistler mode" which is substantially circularly polarized. In addition, since the propagation medium is tenuous plasma, these waves are almost entirely magnetic.

Finally, signaling systems using circular polarized waves as an aid in discrimination against unwanted signals might prove useful. Such a system could, for example, transmit binary information by assigning one sense of polarization to a binary "1" and the other sense of circular polarization to a binary "0."

Heretofore proposed systems for detecting electromagnetic waves in the circularly polarized mode have been of limited usefulness due to the large amounts of wave energy in other modes which impinge upon the receiver. In other words, prior art detectors for the circular electric mode have had very poor discrimination against wave energy in other modes.

It is an object of the present invention to detect electromagnetic wave energy in the circularly polarized mode.

It is a more specific object of the invention to discriminate strongly against wave energy transmitted in modes other than the circularly polarized mode.

In accordance with the present invention, these and other objects are achieved by the use of an antenna configuration including two rod or bar antennas arranged to pick up two orthogonal components of electromagnetic wave energy impinging thereon. One of these components is shifted in phase by ninety degrees. The two components are then compared in phase, preferably by being multiplied together in a straightforward analog fashion to produce a product. This product is integrated with a time constant long compared to the frequency involved and the output of the integrator applied to a polarity detector.

Wave energy in the circularly polarized mode, impinging on the antenna configuration described above, produces signal components on each antenna which are equal in magnitude, but ninety degrees out of phase. After shifting one of these components by ninety degrees, the resulting components are either exactly in phase or exactly 180 degrees out of phase. A simple phase detector serves to sense these two phase conditions. In particular, upon multiplying these components together, a product is produced which has twice the frequency of the original wave, but which is entirely positive or entirely negative, depending on the phase relationship. After integrating the signal, a direct current signal is produced, the polarity of which represents the sense of polarization of the original circularly polarized wave.

Linearly polarized wave energy impinging upon the antenna configuration described above, on the other hand, produces in-phase components in the two antennas. After shifting one of these components by ninety degrees and multiplying components together, a signal is produced which is symmetrically centered about zero magnitude. Integrating this signal will, of course, produce zero output.

It can be seen that the detector in accordance with the present invention discriminates very strongly against wave energy which is not in the circularly polarized mode. For the "whistler mode" propagation described above, the antennas might comprise high permeability ferrite rods to couple strongly to the magnetic components of these waves. For other applications, these antennas might be fabricated from other materials to take advantage of the particulars of the waves being detected.

These and other objects and features, the nature of the present invention and its various advantages, will be more readily understood upon consideration of the attached drawing and the following detailed description of the drawing.

The single figure of the drawing is a schematic block diagram of a detecting circuit for electromagnetic wave energy in the circularly polarized mode in accordance with the present invention.

Referring then to the drawing, there is shown a circularly polarized mode detector comprising two antennas 10 and 11, shown in the drawing as high permeability ferrite bar antennas, but which might comprise any other well known linear antenna elements. For the purpose of this invention, however, it is necessary that antennas 10 and 11 be arranged to discriminate strongly in favor of two energy components polarized in mutually orthogonal directions of polarization.

Antennas 10 and 11 are connected to preamplifiers 12 and 13, respectively, which, in turn, are connected to mixing circuits 14 and 15, respectively. A local oscillator circuit 16 is provided as a heterodyning source. Signals from oscillator 16 are applied directly to mixing circuit 15 and by way of phase shifting circuit 17 to mixing circuit 14. Phase shifting circuit 17 provides precisely a ninety degree phase shift and may be constructed in any manner well known in the art.

As is well known, the phase shifting of the heterodyning signal applied to mixer 14 produces modulation products which are likewise shifted ninety degrees from the modulation products generated by the same heterodyning signal without the phase shift. Thus the output of mixing circuit 14 is shifted by ninety degrees with respect to the output of mixing circuit 15. Alternatively, a ninety degree phase shifting circuit could be supplied between mixing circuit 14 and I.F. amplifier 18, and phase shifting circuit 17 omitted. Since the construction of a phase shifting circuit for a single frequency signal is considerably simpler than for a band of signals, the preferred embodiment shown in the figure includes phase shifting circuit 17 in in the position shown. As a third alternative, a forty-five degree phase shifter could be provided for each path, one leading and one lagging. These phase shifters could be inserted between the oscillator 16 and mixers 14 and 15, respectively, or between mixers 14 and 15 and I.F. amplifiers 18 and 19, respectively.

The outputs of mixing circuits 14 and 15 are applied to intermediate frequency amplifiers 18 and 19, respectively, which are of the well known type having a narrow passband chosen to select one of the modulation products from mixers 14 and 15. The intermediate frequency amplifiers 18 and 19 are identical and hence select modulation products of the same frequency.

After amplification, these modulation products are applied to a phase-detecting circuit 30 comprising an analog multiplying circuit 20 which may comprise any circuit known in the prior art which produces an output proportional to the product of two input signals. Such a circuit might comprise, for example, a dual grid vacuum tube, the output of which is equal over a significant range, to the product of two input signals applied to the two grids.

The output from analog multiplying circuit 20 is applied to integrating circuit 21 which may comprise any integrator known to the prior art. The time constant of integrating circuit 21 is chosen so as to be long compared to the period of the signals delivered by intermeriate frequency amplifiers 18 and 19. Thus, the output of intergrating circuit 21, comprising a direct current signal, is applied to polarity detector 22. Detector 22 might, for example, be a simple diode network used to ascertain the polarity of the direct current signal from integrating circuit 21. A positive polarity, for example, produces an output on output lead 23 indicating that the signal components are in phase, while a negative signal produces an output on lead 24, indicating that the signal components are 180 degrees out of phase. Any other phase detecting arrangement would be equally suitable.

A detector circuit 25 is connected directly to the output of intermediate frequency amplifier 18 while a similar detecting circuit 26 is connected directly to the intermediate amplifier 19. The outputs of detectors 25 and 26 are supplied to terminals 27 and 28, respectively.

The circular mode receiving circuit has been illustrated in the figure in a single preferred embodiment only for the purposes of simplicity. For example, many other types of antenna structures, coupling to electric field components rather than magnetic field components, could be used. Similarly, the heterodyne receiver is likewise only illustrative. The two components could just as well be detected by any other known technique. Finally, phase detector 30 might comprise any known type of phase sensitive circuit. Indeed, since detector 30 need only respond to in-phase and 180 degrees out-of-phase conditions, only a very rudimentary type of phase detection is possible. The multiplier 20 and integrator 21, however, have the distinct advantage of automatically cancelling out all components which do not have the required phase relationships.

In accordance with the illustrated preferred embodiment of the present invention, wave energy in the circularly polarized mode which impinges upon antennas 10 and 11 produces in these antennas signal components which are ninety degree out of phase. Linearly polarized signals, on the other hand, produce in antennas 10 and 11 signal components which are in phase. These signal components are amplified in preamplifiers 12 and 13 and applied to mixers 14 and 15. Locally generated heterodyning signals from oscillator 16 are also applied to mixers 14 and 15. One of the modulation products thereby generated is selected by I.F. amplifiers 18 and 19. Due to the phase shift introduced by circuit 17, the modulation products from mixing circuit 14 are shifted by an additional ninety degrees.

If the signal components originally picked by antennas 10 and 11 are ninety degrees out of phase, a further ninety degree phase shift of one of these components produces two components which are either exactly in phase or which are exactly 180 degrees out of phase. When multiplied together, these signals produce a product which is always positive or always negative. That is, the product is either entirely above the zero level or is entirely below. In either case, the integrator circuit 21 produces a direct current having a significant value.

If, on the other hand, the components picked up by antennas 10 and 11 are in phase, the ninety degree phase shift applied to one of these components causes the two components applied to multiplying circuit 20 to be ninety degrees out of phase. When multiplied together, these orthogonal components produce a signal of twice the frequency of the original components but centered symmetrically around the zero magnitude level. When these components are integrated by integrating circuit 21, the direct current level is zero. Moreover, mixed circularly and linearly polarized components are automatically separated by multiplier 20 and integrator 21, leaving only the circularly polarized components to operate polarity detector 22. It is, therefore, clear that the detecting circuit of the drawing discriminates strongly against the linearly polarized signals.

Since the wave energy impinging on antennas 10 and 11 may involve linearly polarized components along with the circularly polarized components, greater discrimination can be obtained by simultaneously measuring separately the magnitude of each of the components picked up by these antennas. To this end, detecting circuits 25 and 26 are provided to detect the level of the signal components from I.F. amplifiers 18 and 19. These magnitudes are supplied to terminals 27 and 28, respectively, and can be used in combination with the outputs at leads 23 and 24 to further analyze the mode structure of the wave energy impinging on antennas 10 and 11.

It is to be understood that the above-described arrangements are merely illustrative of the numerous and varied other arrangements which may constitute applications of the principles of the invention. Such other arrangements may readily be devised by those skilled in the art without departing from the spirit or scope of this invention.

What is claimed is:

1. A detecting circuit comprising antenna means for intercepting two electromagnetic wave energy components in orthogonally related polarizations, means for shifting the phase of one of said components by ninety degrees, means for deriving the algebraic product of said phase shifted component and the remaining component, and means responsive to the direct current component of said product for indicating the sense of circular polarization of said electromagnetic wave energy.

2. A receiving system for circularly polarized electromagnetic waves comprising antenna means for deriving two mutually orthogonal components of said waves, means for shifting the relative phase of said two components by ninety degrees, and means for detecting the relative phase of said two components.

3. The receiving system according to claim 2 further including a source of local oscillation, means for modulating said two components with said local oscillations, and means for selecting corresponding modulation products from the outputs of said modulating means.

4. The receiving system according to claim 2 wherein said phase detecting means comprises means for deriving the algebraic product of said two components, and means for detecting the direct current component of said product.

5. A receiving circuit for circularly polarized waves comprising first antenna means for receiving a first linearly polarized component of said waves, second antenna means for receiving a second linearly polarized component of said waves orthogonally related to said first component, a source of heterodyning oscillations, means for modulating said first and second components with heterodyning oscillations from said source, means for shifting the relative phase of said two heterodyned components by ninety degrees, means for selecting a corresponding modulation product from each of said modulation means, means for deriving the analog product of said corresponding modulation products, and means for detecting the average level of said analog product.

6. The receiving circuit according to claim 5 further including separate means for detecting each of said selected modulation products.

7. The receiving circuit according to claim 5 wherein said means for shifting phase comprises a phase shifting circuit connected between said source of heterodyning oscillations and one of said modulating means.

8. A detecting circuit for discriminating in favor of circularly polarized signal components comprising means for intercepting two mutually orthogonal signal components, means for shifting the relative phase of said two orthogonal components by ninety degrees, and means for detecting whether said two orthogonal components are in phase or 180 degrees out of phase.

9. The detecting circuit according to claim 8 wherein said intercepting means comprises two perpendicular bars of material having substantial permeability and resistivity.

10. The detecting circuit according to claim 8 wherein said phase detecting means comprises means for deriving a signal whose sign varies as the sign of the instantaneous product of said orthogonal components, and integrating means connected to said signal deriving means.

References Cited

UNITED STATES PATENTS

| | | | |
|---|---|---|---|
| 3,013,150 | 12/1961 | Gutleber | 325—368 |
| 3,035,231 | 5/1962 | Neelands et al. | 329—124 |

KATHLEEN H. CLAFFY, *Primary Examiner.*

R. S. BELL, *Assistant Examiner.*

U.S. Cl. X.R.

325—369; 343—703